(12) United States Patent
Luo et al.

(10) Patent No.: US 8,631,717 B2
(45) Date of Patent: Jan. 21, 2014

(54) SENSORLESS ADAPTIVE SAFETY ACTUATOR (SASA)

(75) Inventors: Ren C. Luo, Taipei (TW); Yi-Wen Perng, Hsinchu (TW); Jing Wen Chen, Taipei (TW)

(73) Assignee: National Taiwan University, Taipei (TW)

( * ) Notice: Subject to any disclaimer, the term of this patent is extended or adjusted under 35 U.S.C. 154(b) by 374 days.

(21) Appl. No.: 13/013,900

(22) Filed: Jan. 26, 2011

(65) Prior Publication Data

US 2011/0179898 A1 Jul. 28, 2011

(30) Foreign Application Priority Data

Jan. 27, 2010 (TW) .............................. 99102306 A (51) Int. Cl.
*F16H 35/10* (2006.01)
*F16D 43/20* (2006.01)

(52) U.S. Cl.
USPC ......................... 74/405; 74/412 TA; 192/150

(58) Field of Classification Search
USPC ............. 192/56.56; 475/263; 74/350, 412 TA
See application file for complete search history.

(56) References Cited

U.S. PATENT DOCUMENTS 2,464,590 A * 3/1949 Landahl ..................... 192/56.56

* cited by examiner

*Primary Examiner* — Rodney Bonck
(74) *Attorney, Agent, or Firm* — Rosenberg, Klein & Lee (57) ABSTRACT

One aspect of the instant disclosure is to provide a sensorless adaptive safety actuator. The safety actuator comprises a driving unit, a transmission unit coupled to the driving unit, and an output unit coupled to the transmission unit. The transmission unit comprises a load-adaptable retracting mechanism. When the output unit experiences a mechanical load exceeding a critical value, the load-adaptable retracting mechanism causes the transmission unit to decouple from the driving unit. Thus, responding to an accident where the impact on the output unit causes a force/torque overload, the instant safety actuator is capable of effectively stopping the force/torque transmission to the work output device without the use of active sensors.

8 Claims, 7 Drawing Sheets

SENSORLESS ADAPTIVE SAFETY ACTUATOR (SASA)

BACKGROUND OF THE INVENTION

1. Field of the Invention

The present invention relates to a sensorless adaptive safety actuator; in particular, to a sensorless adaptive safety actuator applicable to automated robotic manipulator systems which safety actuator operates in the absence of active sensors.

2. Description of Related Art

Interaction with automated mechanical devices often poses potential danger. While the advancement in robotics automation encourages development of high speed, high precision industrial robots, these sophisticated pieces of equipment generally lack the capability of spontaneously reacting to uncontrolled environments. Therefore, traditional safety measures in handling the automated mechanical devices is to segregate them in a constrained environment, such as a factory assembly line, and keep the human operators at a safe distance away from the operating parameter of the automated machines.

Modern advanced robots are frequently endowed with active electronic sensors to provide their human operators safer human-machine interaction experiences. Some robots are even equipped with active emergency stopping devices as an extra protective precaution. For one thing, the manual emergency kill switch that responds to human input that often accompanies heavy robotic equipments is a primitive example. More sophisticated active safety measures may require the utilization of optical sensors, pressure sensors, audio sensors, etc. Moreover, these sophisticated sensors generally require specialized processors properly programmed to process the information gathered by the sensors. Thus, the active safety measurements are often expensive to implement, occupy precious space and loading capacity of the automated robots, and require high levels of maintenance efforts to function properly. More importantly, a majority of robot-related accidents happen during regular maintenance when the active sensors are deactivated and rendered useless. Thus, over reliance on active sensors in sophisticated robotics poses inherent risks as the melt function or deactivation of such sensors would render the robotic devices incapable of safely reacting to environmental variables, including their human operators.

To enable more thorough integration of automated robotics into modern daily life, there exists a need for developing a passive sensorless actuator applicable to automated robotic devices to provide reliable and cost-effective safety protections.

SUMMARY OF THE INVENTION

One aspect of the present invention is to provide a load-adaptive sensorless safety actuator. The safety actuator comprises a driving unit coupled to a transmission unit, and a work output unit coupled to the transmission unit. The transmission unit comprises a load-adaptable retracting mechanism. When the work output unit experiences a mechanical load exceeding a critical value, the load-adaptable retracting mechanism mechanically reacts to the load and causes the transmission unit to decouple from the driving unit. Thus, responding to an accident, the instant safety actuator is capable of effectively stopping the force/torque transmission to a work output device without the use of an electronic sensor.

Another aspect of the instant disclosure is to provide a load-adaptive sensorless safety transmission apparatus in an actuator system. The load-adaptive sensorless safety transmission apparatus comprises a transmission assembly and a load-adaptive transmission unit. The transmission assembly includes a rotary housing having a ring gear fixedly coupled therewith. The load-adaptive transmission unit comprises a load-adaptable retracting mechanism. When the transmission unit experiences a mechanical load exceeding a critical value, the load-adaptable retracting mechanism causes the transmission unit to decouple from the driving unit, thus effectively stops the force/torque transmission to a work output device.

Yet another aspect of the instant disclosure is to provide a load-adaptable sensorless retractable apparatus in a transmission unit of an actuator system. The sensorless retractable apparatus comprises a load-adaptive transmission mechanism and a load-adaptable retracting mechanism. The load-adaptive transmission mechanism includes a retractable transmission member capable of transmitting an axial load and a load-reactive spring. The load-adaptable retracting mechanism includes a retracting slide and a collapsible mechanism. The collapsible mechanism comprises a toggle sliding mechanism and a toggle stopper. When the retractable transmission member experiences an axial load that exceeds the critical value of the load-reactive spring, a trigger device in the transmission mechanism will disengage the trigger stopper, therefore allowing the toggle sliding mechanism to slide into a collapsed configuration. The collapsed toggle sliding mechanism in-turn draws the load-adaptive transmission mechanism away from a driving configuration, thus effectively decouples the transmission member from the transmission unit of the actuator. In this manner, when the instant retractable mechanism is employed in an actuator system having a driving unit and a output device, the force/torque output from a driving unit to the work output unit can be stopped immediately without need for input from any kind of active sensor.

The following embodiments are provided along with illustrations to further facilitate the understanding of the instant disclosure.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
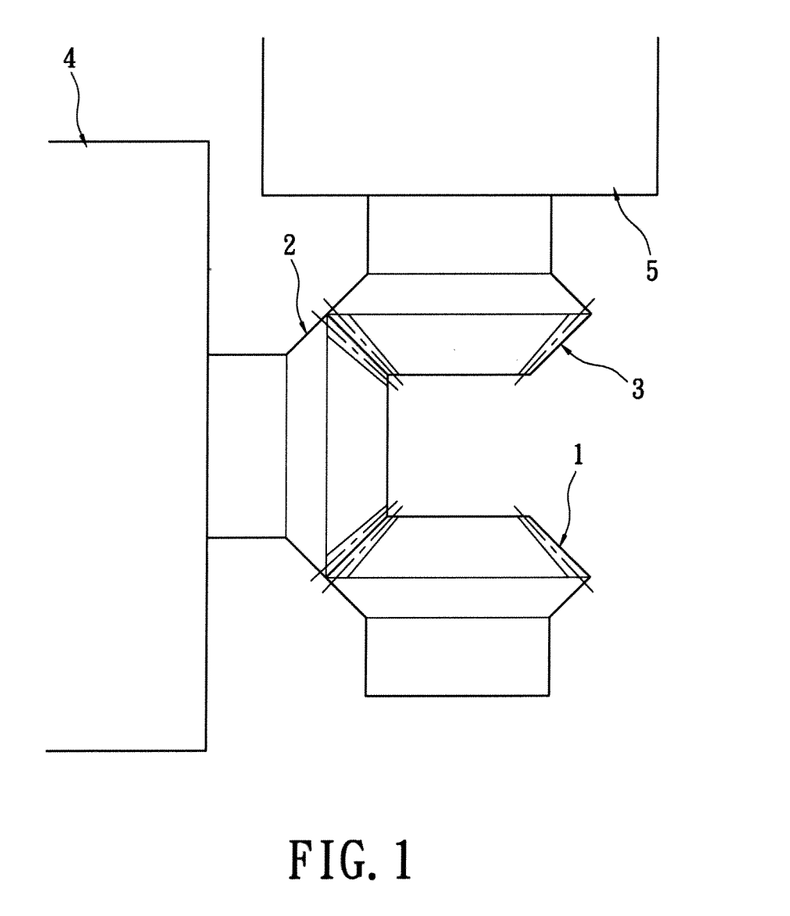
FIG. 1 shows a structural overview for the load-adaptive sensorless safety actuator.

Please refer to FIG. 1, which shows the structural arrangement for the load-adaptive sensorless safety actuator. The safety actuator comprises a driving unit 1 at an input port; a transmission unit 2 having a load-adaptive retractable mechanism 4 at a load-responding port coupled to the driving unit 1; an output unit 3 at an output port coupled to the transmission unit 2; and a work output device 5 coupled to the output unit 3.

The driving unit 1 at the input port provides the force/torque input to the system. An example of a driving unit is an electric motor. The driving unit 1 further comprises a driving member at the input port for mechanically transmitting the input force/torque to the transmission unit 2. The driving member can be a mechanical transmission coupler capable of transmitting axial force, such as a bevel gear, a helical gear, or a spiral bevel gear. The transmission unit 2 also comprises a driving member capable of reacting to an axial force. The transmission unit 2 is coupled to the load-adaptive retractable mechanism 4. The transmission unit 2 is further coupled to the output unit 3. The output unit 3 also comprises a driving member capable of transmitting an axial force as described above. The output unit 3 then couples to the work-output device 5 for carrying out a specifically designed task. The work-output device 5 can be an automated functional device such as a robotic manipulator, etc. The load-adaptive retractable mechanism 4 is designed to mechanically respond to an axial load on the transmission unit 2 as a result of a change in angular impulse. When the axial load on the transmission gear of the transmission unit 2 reaches a critical limit, the retractable mechanism 4 will mechanically react to the excessive load and withdraw the transmission unit 2 from the transmission port, thereby decoupling the transmission unit 2 from the actuating system. As a result, the input force/torque will no longer be transmitted to the output unit 3. The decoupling of the transmission unit 2 will effectively prevent excessive force/load being transmitted to the work output device 5, preventing potential damage and injury caused by the work output device 5 to the surrounding environment and the living beings in the vicinity.

Figure 2:
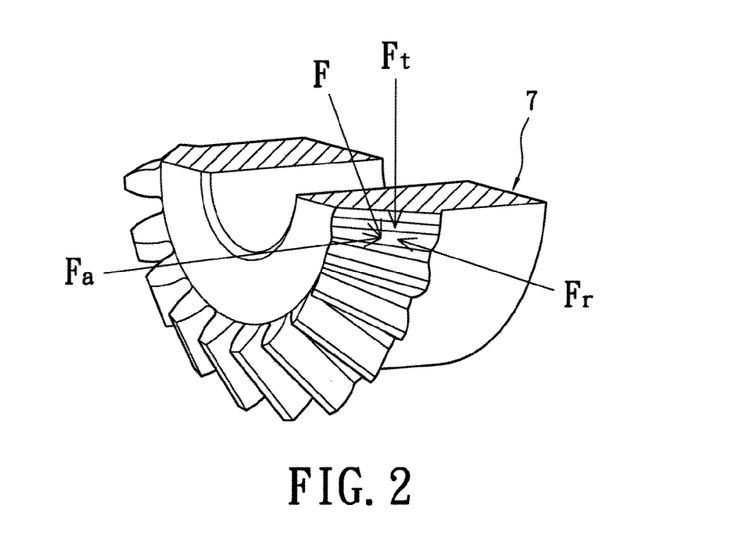
FIG. 2 shows a force analysis diagram of a bevel driving gear in the instant safety actuator.
Figure 3:
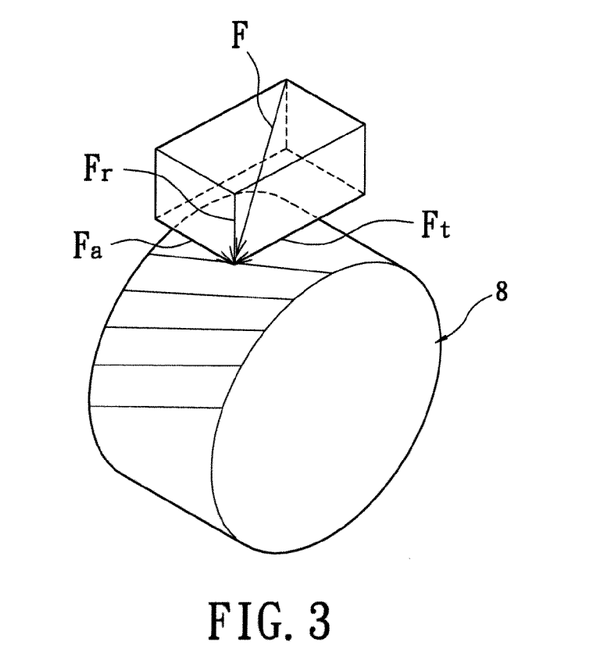
FIG. 3 shows a force analysis diagram of a helical driving gear in the instant safety actuator.

FIGS. 2 and 3 are the force analysis diagrams of the driving member, such as a bevel gear in FIG. 2 or a helical gear in FIG. 3. The driving member in the instant disclosure should be capable of transmitting an axial load. For one thing, bevel gears, helical gears, and spiral bevel gears are capable of transmitting axial loads, and are therefore suitable for this application. The axial force is a vector component of the total force acting on the driving gear that has a direction parallel to the axle of the driving gear. As shown in FIGS. 2 and 3, the total force acting on a gear is denoted as F. Employing vector analysis, the total Force F can be separated into three components $F_a$, $F_r$, and $F_t$. $F_a$ is the axial component of the total force F, and has a direction parallel to the axle of the driving gear 7/8. $F_r$ is the radial component of the total force F; it has a direction parallel to the radius and toward the center of the gear. The tangent force $F_t$ is the tangential component of the total force F, and has a direction that is perpendicular to the radial force $F_r$.

For one thing, the angled engaging teeth of a bevel/helical gear enable the driving gear to transmit/react to the axial force $F_a$. During the operation of the instant safety actuator, the transmission gear of the transmission unit 2 engages the output gear of the output unit 3 to transmit force/torque from the driving unit 1. When the output unit experiences a disruption, for example, a disruption caused by the coupled work-output device hitting a human operator, the sudden change of angular momentum of the work-output device 5 creates an angular impulse in a direction opposite to the original path of travel. The angular impulse generated from the disruption will then be transmitted to the driving gear of the transmission unit 2 via the output unit 3 in the form of an axial force $F_a$. The axial force $F_a$ acts in the direction of the driving gear axle and thus pushes the transmission unit 2 inward. The retractable mechanism 4 is designed to react to the pushing force $F_a$ from the transmission unit 2 and change the mechanical configuration to cause the retraction of the transmission unit 2, thereby decoupling the transmission gear from the driving unit 1 and the output unit 3.

Figure 4:
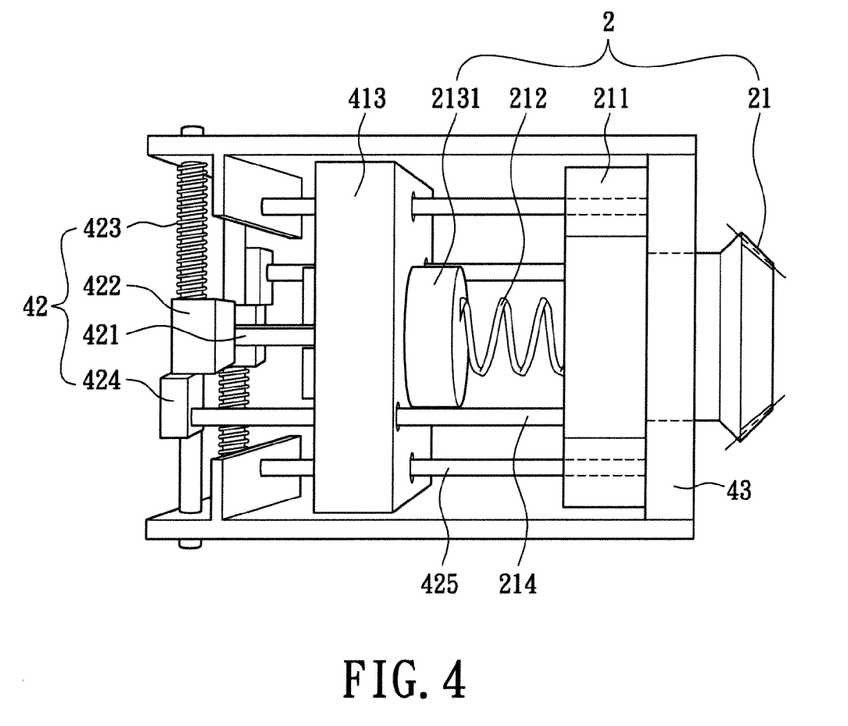
FIG. 4 shows a side view of a preferred embodiment of the load-adaptable transmission assembly.

Referring to FIG. 4, which shows a side view of a preferred embodiment of the transmission assembly and the load-adaptable retracting mechanism. The transmission assembly having a case 43 comprises a transmission unit and a load-adaptable retractable mechanism. The transmission unit comprises a transmission gear 21 rotatably mounted on a sliding base 211 coupling to a load-reactive spring 212. The sliding base 211 further includes at least one trigger mechanism 214. The retractable mechanism comprises a retracting slide 413 and a collapse mechanism 42. The load-reactive spring 212 is employed to provide elastic coupling between the transmission unit and the retractable mechanism, so that only when a load on the transmission unit exceeds a critical limit will the load-reactive spring 212 allow the trigger mechanism 214 of the sliding base 211 to trigger the collapse mechanism 42. The critical limit of the actuator system and the sensitivity of the retractable mechanism are primarily determined by the choice of the load-reactive spring 212. Furthermore, a loading-spring adjustment mechanism 2131 can be utilized to provide easy swapping of the load-reactive spring 212 as well as adjusting the pre-load value of the load-reactive spring using the onboard adjusters 2132 (shown in FIG. 5). The sliding base 211 and the retracting slider 413 are guided by at least one guiding rail (425). The guiding rail (425) is arranged in a direction parallel to the axle of the driving gear 21, thus permits only the sliding motions of the sliding base 211 and the retracting slide 413 substantially in the direction of an axial force load. The collapsible mechanism 42 of the instant embodiment comprises a toggle sliding mechanism 422 having at least one toggle link 421, at least one toggle spring 423, and a toggle stopper 424.

The collapsible mechanism 42 has two configurations of operation: a driving state and a collapsed state. During normal operation, the axial load on the transmission unit remains within the critical limit of the actuator system. Thus, the axial load on the transmission unit 2 is insufficient to significantly compress the load-reactive spring 212 to cause the triggering of the toggle sliding mechanism 422. Therefore, the transmission unit 2 remains engaged in the transmission system and establishes a driving state. However, the driving state is changed into a collapsed state when the axial load on the transmission unit 2 reaches the critical limit. As the axial load on the transmission unit 2 exceeds the critical limit, the load-reactive spring 212 can no longer refrain reframe the trigger mechanism 214 from triggering the toggle sliding mechanism 422. Specifically, as the trigger mechanism 214 removes the toggle stopper 424 from a blocking position, the toggle sliding mechanism 422, under tension of the toggle spring 423, is allowed to move into a collapsed position. Consequently, the toggle link 421, which has its two ends pivot-ably coupled to the retractable slide 413 and the trigger mechanism 422 respectively, draws the retractable slide 413 backward into a collapsed state. As a result, the transmission unit 2, which is coupled to the retractable slide 413 by the load-reactive spring 212, is caused to retract from the engaged position and becomes decoupled from the transmission system.

Figure 5:
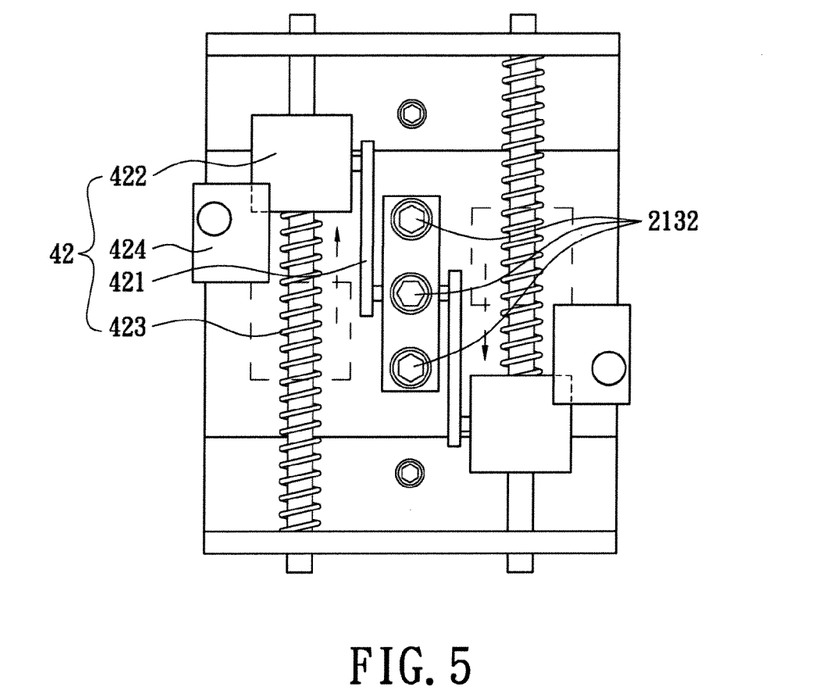
FIG. 5 shows a rear structural view of the retractable mechanism 4.

Referring to FIG. 5, which shows a rear structural view of the retractable mechanism 4. The adjuster 2132 can be used to adjust the preload value of the load-reactive spring 212. During the driving stage, the toggle stopper 424 is in a blocking position and refrains the toggle sliding mechanism 422 from sliding into a collapsed position (as shown by the dotted lines). However, as the axial load on the transmission unit 2 exceeds the critical limit, the toggle stopper 424 is pushed away from the blocking position, allowing the toggle sliding mechanism 422 to slide in the direction of the arrows and reach the collapsed state. Consequently, the toggle link 421 draws the transmission unit 2 back and decouples it from the transmission system of the actuator.

Figure 6:
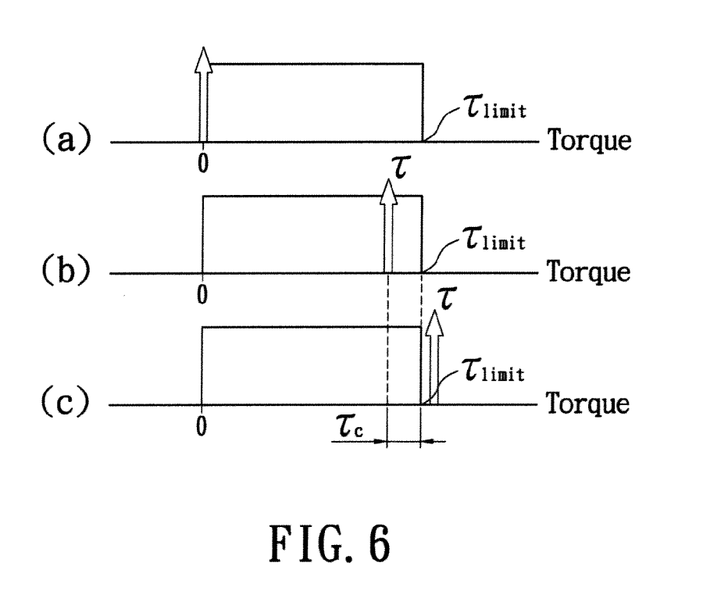
FIG. 6 shows the torque limit diagrams on the transmission unit 2.

FIG. 6 shows a graph of the force/torque on the transmission unit 2. Particularly, FIG. 6a illustrates the system under zero loading, that is, when the transmission system is not in operation. The arrow represents the axial load on the transmission unit 2, which is zero in this case. Under normal operation, the transmission unit 2 of the actuator system is subjected to an axial load, as shown by the arrow in FIG. 6b. The retractable mechanism is not triggered as long as the axial load does not exceed the critical limit $\tau_{limit}$. However, in an accident where the work output device of the actuator system accidentally strikes an operator, the sudden change in angular impulse of the system will cause an increased axial load on the transmission unit 2. If the axial load exceeds the critical limit, the collapse mechanism 42 will be triggered, causing the retraction of the transmission unit 2 from the driving position.

Figure 7:
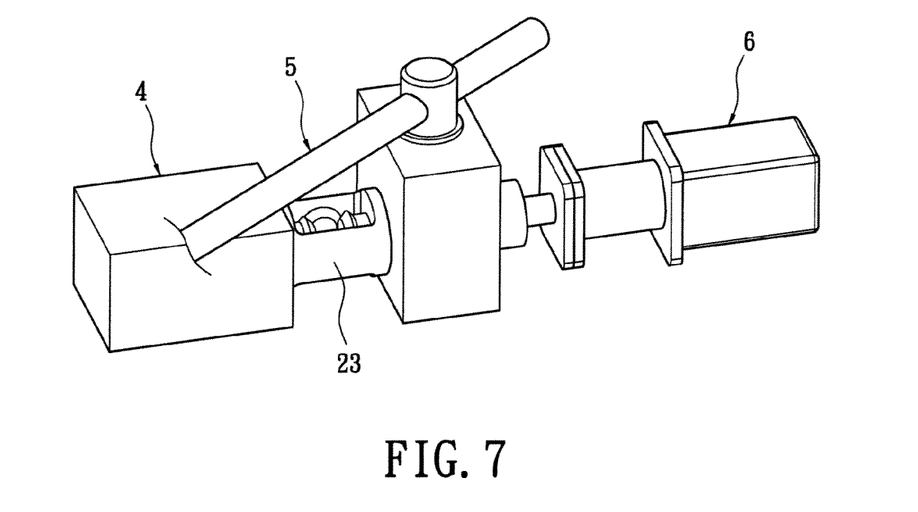
FIG. 7 shows a preferred embodiment of the instant safety actuator.
Figure 8:
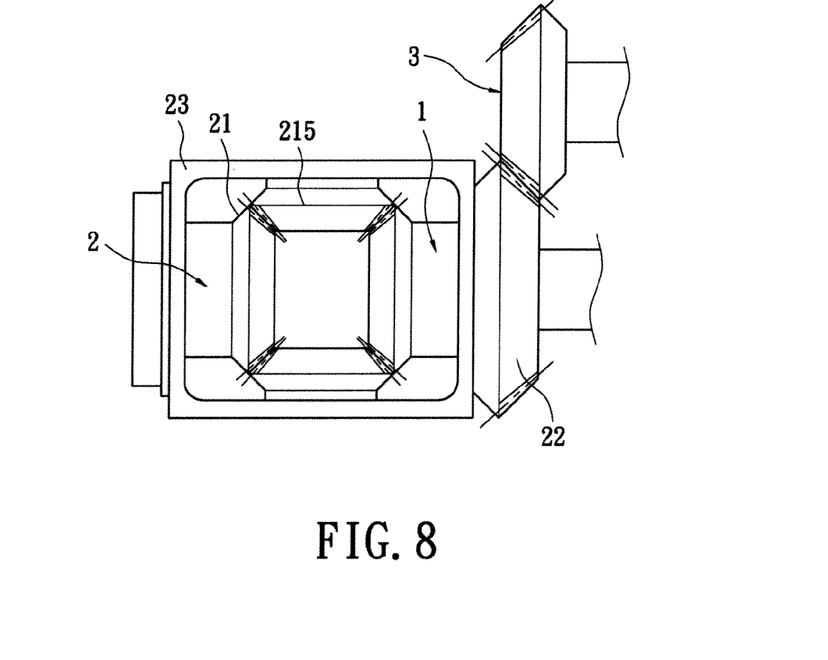
FIG. 8 shows a structural arrangement of a transmission unit according to the instant safety actuator.

Referring to FIG. 7, which shows a preferred embodiment of the instant safety actuator. The actuator comprises a driving unit 6 in the form of an electric motor, a transmission assembly housed in a rotary housing 23 is coupled to a load-responding retractable mechanism 4, and a work-output device 5 connecting to an output unit (received in the housing and hidden from view) coupled to the transmission assembly. Referring to FIG. 8, which illustrates the structural arrangement of the transmission unit 2 in FIG. 7. The transmission assembly comprises a rotary housing (23) having an input port, at least one planetary port, and a load-responding port. The input port of the rotary housing (23) rotatably receives the driving member of the driving unit 1. Opposite to the input port on the rotary housing (23) is the load-responding port for rotatably receiving the driving member of the transmission unit 2. The at least one planetary port of the rotary housing (23) rotatably receives at least one planet gear 215 for coupling the driving unit 1 and the transmission unit 2. A ring gear 22 is fixedly coupled to the rotary housing (23) and is further coupled to an output port of the work-output device 5 shown as a mechanical swinging arm in FIG. 7.

During normal operation, the axial load on the transmission unit remains within the critical limit of the actuator system. The axial load on the transmission unit 2 is thus insufficient to trigger the toggle sliding mechanism 422 of the collapse mechanism 422. Therefore, the transmission gear remains engaged in the transmission system and establishes a driving state. In the driving state where the torque distribution is identical across the input end and the output end of the rotary housing 23, the input gear, the output gear, and the planet gears in the transmission assembly in the housing function like a differential unit with the planet gears remain substantially stationary. Driven by the input and the load-responding gears, the rotary housing 23 rotates about the axle of the driving unit and drives the ring gear 22. The input force/torque from the driving unit 1 is therefore transmitted to the output unit 3. However, when a sudden change in angular momentum occurs, for example, when the work-output device 5 of the actuator system comes in sudden contact with a human operator, the rotational impulse generates an axial force on the transmission gear. Upon reaching the critical level of the system, the excessive axial load would trigger the collapse mechanism 42 in a fashion discussed above and decouples the transmission gear from the transmission system. As a result, the input torque that originally drive the rotary housing 23 is translated into the rotation of the planet gears 215/216 instead. Because the driving force/torque from the driving unit 1 is no longer transmitted to the ring gear 22 of the rotary housing 23, the work-output device 5 is kept from causing further damage to the surrounding environment.

Figure 9A:
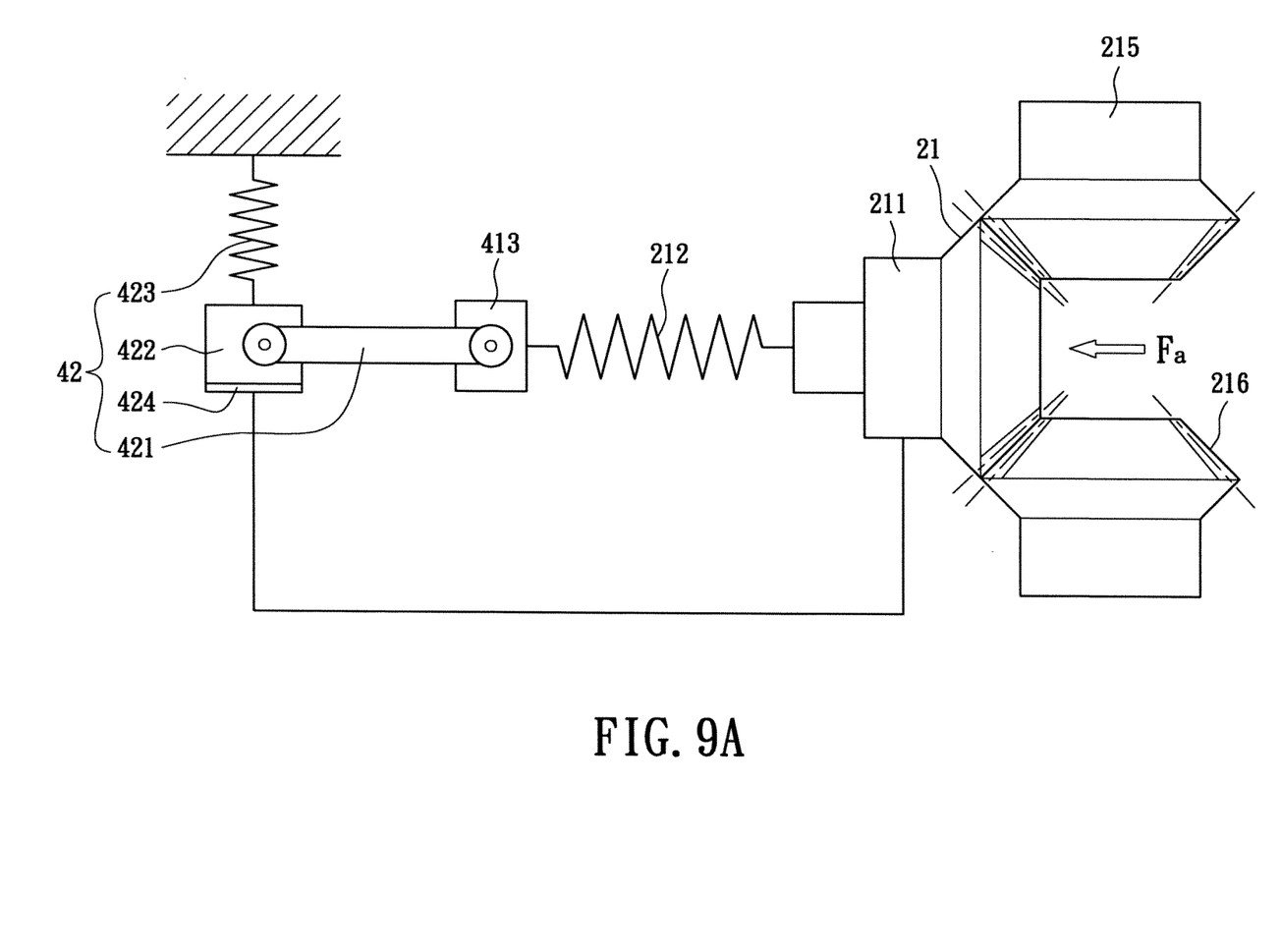
FIG. 9A shows a structural diagram of the instant safety actuator in a driving state.
Figure 9B:
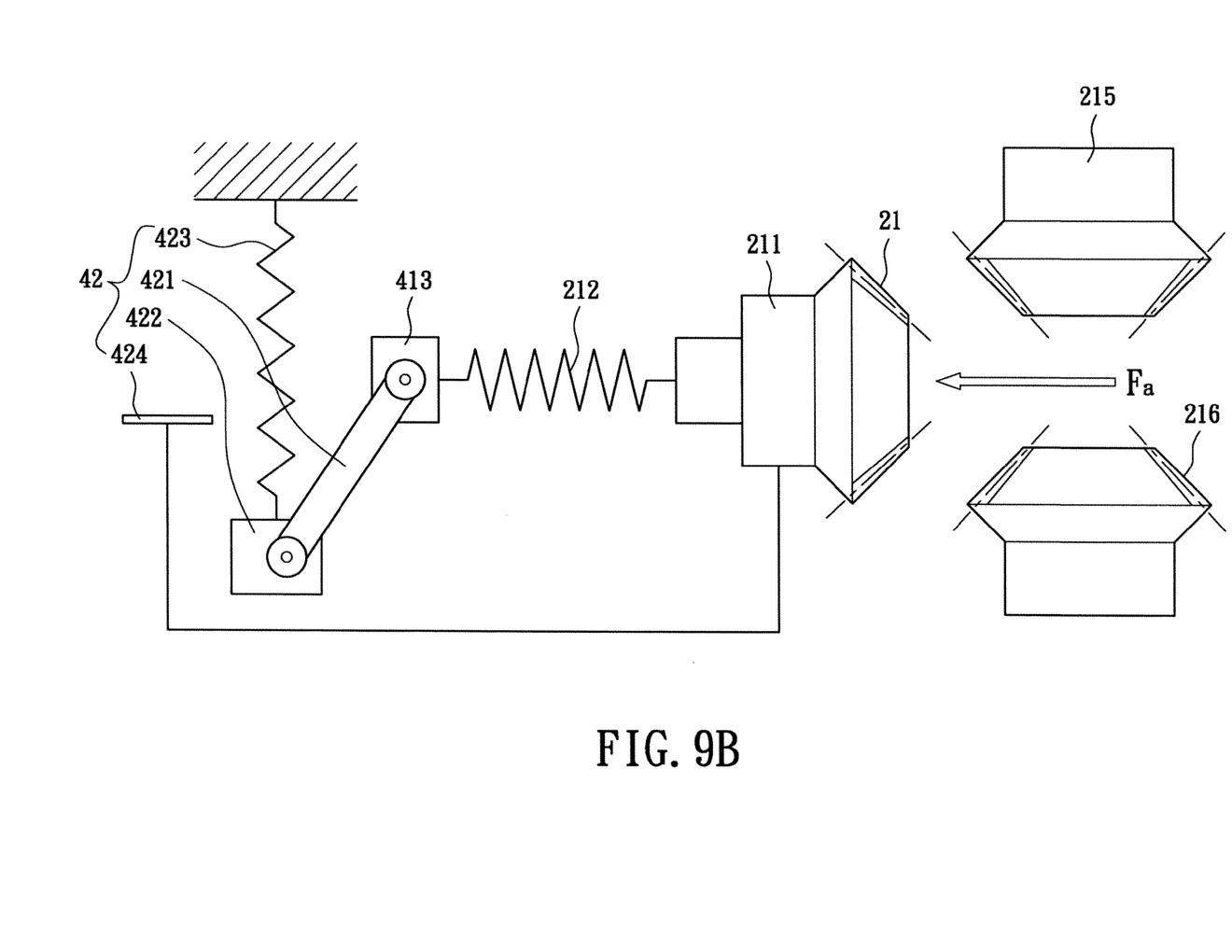
FIG. 9B shows a structural diagram of the present safety actuator in a collapsed state.

FIG. 9A provides a structural overview of the safety actuator system in the driving state. During normal operation, the transmission unit 2 of the actuator system is subjected to an axial load. The axial load translates into an axial force $F_a$ on the transmission gear 21. The retractable mechanism will not be triggered as long as the axial load does not exceed a critical limit $\tau_{limit}$ as discussed previously. However, in an accident where the work output device of the actuator system accidentally strikes an operator, the sudden change in angular impulse of the system will cause an increased axial load on the transmission unit 2. Finally, referring to FIG. 9B. Once the axial load exceeds the critical limit of the actuator system, the collapse mechanism 42 is triggered, causing the retraction of the transmission unit 2 from the driving position.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A load-adaptable sensorless retractable apparatus in a transmission unit of an actuator, comprising:
   (i) a transmission mechanism including a retractable transmission member capable of transmitting an axial load, a load-reactive spring, and a spring adjustment mechanism coupled to the load-reactive spring,
   wherein the retractable transmission member is rotatably mounted on a sliding base, and
   wherein the sliding base is guided by at least one guiding rail in a direction substantially parallel to the direction of the axial force load; and
   (ii) a load-adaptable retracting mechanism having a retracting slide and a collapsible mechanism having a toggle sliding mechanism,
   wherein when the transmission member experiences an axial load exceeding a critical value, the load-adaptable retracting mechanism causes the transmission member to decouple from the transmission unit of the actuator.

2. The load-adaptable sensorless retractable apparatus of claim 1, wherein the spring-adjustment mechanism is disposed on the retracting slide, and wherein the load-reactive spring elastically couples the retracting slide and the sliding base.

3. The load-adaptable sensorless retractable apparatus of claim 1, wherein the collapsible mechanism comprises (i) a toggle sliding mechanism having at least one toggle link for coupling the retracting slide, (ii) at least one toggle spring for exerting tension on the toggle sliding mechanism, and (iii) at least one toggle stopper for holding the toggle sliding mechanism in a driving configuration.

4. The load-adaptable sensorless retractable apparatus of claim 3, wherein the toggle sliding mechanism is guided by at least one toggle rail, and the toggle spring exerts tension on the toggle sliding mechanism in a direction substantially parallel to the toggle rail.

5. A load-adaptable sensor-less retractable apparatus in a transmission unit of an actuator, comprising:
- a transmission mechanism including a retractable transmission member capable of transmitting an axial load and a load-reactive spring; and
- a load-adaptable retracting mechanism having a retracting slide and a collapsible mechanism, the collapsible mechanism comprising:
  - a toggle mechanism having at least one toggle link for coupling the retracting slide,
  - at least one toggle spring for exerting tension on the toggle mechanism, and
  - at least one toggle stopper for holding the toggle mechanism in a driving configuration;
- wherein when the transmission member experiences an axial load exceeding a critical value, the load-adaptable retracting mechanism causes the transmission member to decouple from the transmission unit of the actuator.

6. The load-adaptable sensorless retractable apparatus of claim 5, wherein the transmission mechanism comprises a spring-adjustment mechanism coupled to the load-reactive spring.

7. The load-adaptable sensorless retractable apparatus of claim 6, wherein the spring-adjustment mechanism is disposed on the retracting slide, and wherein the load-reactive spring elastically couples the retracting slide and the sliding base.

8. The load-adaptable sensorless retractable apparatus of claim 5, wherein the toggle sliding mechanism is guided by at least one toggle rail, and the toggle spring exerts tension on the toggle sliding mechanism in a direction substantially parallel to the toggle rail.

\* \* \* \* \*